dip
UNITED STATES PATENT OFFICE.

ROBERT M. CHAPIN, OF WASHINGTON, DISTRICT OF COLUMBIA.

PROCESS FOR THE PREPARATION OF A CONCENTRATED ANIMAL-DIP.

1,137,844.	Specification of Letters Patent.	Patented May 4, 1915.

No Drawing.	Application filed May 28, 1914. Serial No. 841,558.

(DEDICATED TO THE PUBLIC.)

*To all whom it may concern:*

Be it known that I, ROBERT M. CHAPIN, a citizen of the United States, and an employee of the Department of Agriculture of the said United States, residing in the city of Washington, District of Columbia, whose post-office address is Washington, District of Columbia, have invented a new and useful Process for the Preparation of a Concentrated Animal-Dip.

This application is made under the act of March 3, 1883, chapter 143 (22 Stat., 625), and the invention herein described and claimed may be used by the Government of the United States or any of its officers or employees in the prosecution of work for the United States or by any person in the United States without the payment of any royalty thereon.

The object of my invention is to provide a new and improved process for the preparation of a concentrated animal dip composed essentially of alkali arsenite and alkali carbonate, together with pine-tar and other valuable ingredients, the product being miscible with water to form a uniform insecticide, appropriate and desirable for the dipping or spraying of cattle or other animals, with a view of ridding them of Texas-fever ticks, or other deleterious parasitic insects. Solutions containing alkali arsenite, alkali carbonate, pine tar and similar materials form an effective and useful bath for destroying Texas-fever ticks and other insects which infest cattle and other animals. Such solutions are usually prepared by boiling together powdered white arsenic and sodium carbonate with water until solution has been effected, cooling the resulting solution to a certain temperature (140° F.), then pouring into the solution pine-tar in a thin stream and then stirring the composition until the pine-tar has become emulsified and uniformly disseminated throughout the solution. Making the solution by this process involves considerable time and personal supervision, and requires a capacious kettle or vat for the boiling and a furnace or other suitable heater for furnishing the necessary heat. Moreover, the resulting dip cannot be prepared in highly concentrated form, first, because of frothing and foaming caused by the rapid escape of carbon dioxid from the boiling mixture, and secondly, because the tar will not emulsify properly except when added to the considerably diluted solution at a degree of temperature approximating 140° F. In experiments which I have made, I have discovered that these difficulties or drawbacks may be readily and conveniently overcome by the substitution of caustic alkali for a portion of the carbonated alkali previously used, and by treating the pine-tar with a certain proportion of water and caustic alkali before adding it to a dilution of the arsenical solution first prepared.

My invention consists in the proper proportioning and method of blending of powdered white arsenic, caustic alkali, carbonated alkali, pine-tar and water, without the use of externally applied heat, so that a highly concentrated product shall result, which, upon dilution with cold water in suitable proportion, will form a uniform liquid suitable for destroying Texas-fever ticks and other insects that infest animals.

In practising my process I employ for solution of the arsenic, an amount of caustic alkali, which is not more than sufficient to chemically combine with the quantity of white arsenic used, to form an alkali metarsenite wherein alkali and arsenic are contained in combination in the proportion of 1 atom of alkali metal to 1 atom of arsenic, the resulting solution thus containing no free caustic alkali. On the other hand, I use not less than 85 per cent. of said theoretical amount of caustic alkali in order to obtain uniformly satisfactory results. I therefore weigh 4 lbs. of caustic soda of purity of not less than 85% actual NaOH into a 5 gallon metal pail into which I pour 1 gallon of cold water. I stir the composition continuously until the caustic soda is practically all dissolved, when I add 10 lbs. of finely powdered white arsenic as rapidly as it can be blended in by constant stirring, though not so rapidly that the heat produced by chemical reaction shall cause the mixture to actually boil. When the arsenic has been entirely added and completely dissolved, I immediately add 1 to 1½ gallons more water and 10 lbs. crystallized sodium carbonate ($Na_2CO_3.10H_2O$), and continue the stirring operation until solution is complete. I then allow the mixture to become cold and finally dilute it with water to a total volume of 5 gallons. I designate this solution as "arsenic stock." I also prepare a "tar stock," in the following manner: I dissolve one-half pound caustic soda in 1 quart water, add thereto 1 gallon pine-tar and stir until the mixture becomes uniform. I then test the mixture by rubbing up about a teaspoonful in a glass of water. If it does not show itself entirely miscible to a uniform emulsion, I blend in successive smaller quantities of a solution of one-half pound caustic soda in a quart of water until the desired result is attained. For use in dipping or spraying, I first dilute 1 gallon of the arsenic stock with about 75 gallons water. I then mix 1 to 1½ quarts of tar stock with 2 or 3 gallons of water and add the mixture to the already diluted arsenic stock. I finally make the total volume of liquid 100 or 125 gallons according to the strength desired, and stir the composition thoroughly before applying the solution to animals.

In preparing the product, caustic potash may be substituted in chemically equivalent amount for caustic soda.

Having thus described my invention I claim:

1. The process for preparing a concentrated animal dip from arsenious oxid, consisting in preparing a strong water solution of caustic alkali, then adding thereto finely powdered arsenious oxid, and simultaneously blending the mixture by stirring, and maintaining the said mixture at a temperature approximately the boiling point without the application of external heat by stirring the composition simultaneously with the addition of the arsenious oxid, dissolving in the resultant solution sodium carbonate, then permitting the dilution of the said solution, and adding thereto pine-tar rendered miscible with water by previous blending, substantially as specified.

2. The process for preparing a concentrated arsenical animal dip consisting in dissolving 4 pounds of caustic soda in one gallon of water, dissolving in said solution 10 pounds of arsenious oxid by aid of heat generated by chemical reaction, then adding to said composition 10 pounds of crystallized sodium carbonate and sufficient water to make the cooled solution amount to a total volume of 5 gallons, permitting the dilution of said solution to an appropriate degree, and then adding thereto a blended mixture of approximately ½ pound of caustic soda, one quart of water, and one gallon of pine-tar substantially as specified.

In testimony whereof I affix my signature in the presence of two subscribed witnesses.

ROBERT M. CHAPIN.

Witnesses:
HORACE H. CUSTIS,
JAMES N. TAYLOR.